T. CAMP.

Cotton-Condenser.

No. 9,234. Reissued June 8, 1880.

WITNESSES:

W. W. Hollingsworth

Edw. H. Byrn.

INVENTOR:

Thomas Camp

BY

ATTORNEYS.

N. PETERS, PHOTO-LITHOGRAPHER, WASHINGTON, D. C.

UNITED STATES PATENT OFFICE.

THOMAS CAMP, OF COVINGTON, GEORGIA.

COTTON-CONDENSER.

SPECIFICATION forming part of Reissued Letters Patent No. 9,234, dated June 8, 1880.

Original No. 208,071, dated September 17, 1878. Application for reissue filed January 5, 1880.

*To all whom it may concern:*

Be it known that I, THOMAS CAMP, of Covington, in the county of Newton and State of Georgia, have invented a new and Improved Cotton-Condenser; and I do hereby declare that the following is a full, clear, and exact description of the same, reference being had to the accompanying drawings, forming part of this specification, in which—

Figure 1:
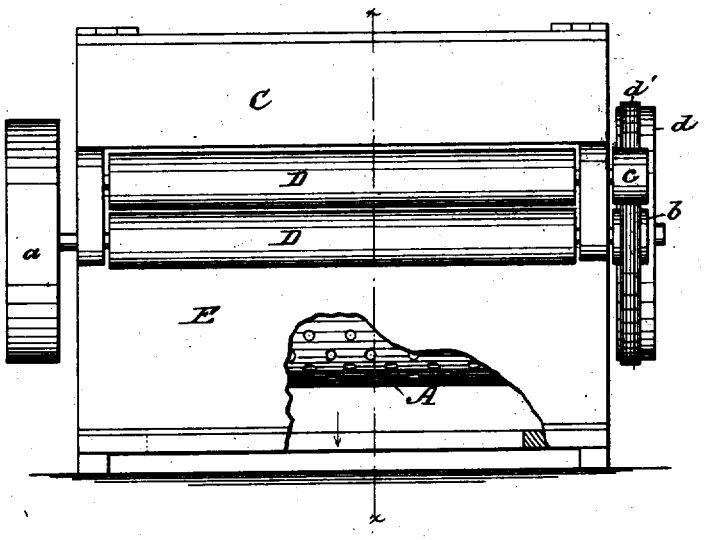
Figure 2:
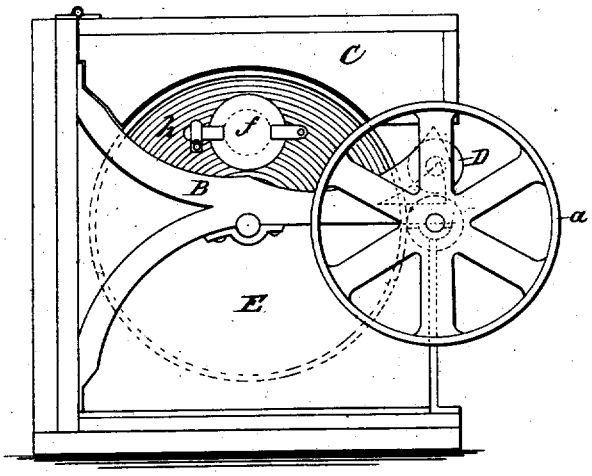
Figure 3:
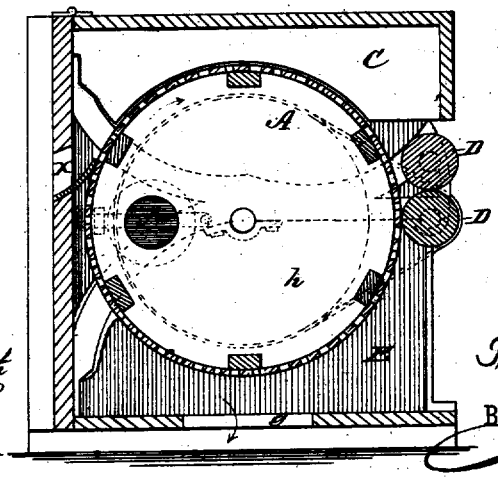

Figure 1 represents a front view, Fig. 2 a side view, and Fig. 3 a vertical transverse section on line *x x*, Fig. 1, of my improved cotton-condenser.

My invention relates to that class of attachments which are adapted to be placed at the discharge end of a cotton-gin for the purpose of cleaning the fleece of its adhering impurities and compressing said fleece into a compact endless sheet prior to being packed in bales.

The general features of the device (which are not peculiar to my invention) are a revolving cylinder having a perforated or meshed periphery which receives the fleece as it comes from the gin and transfers it to two condensing-rollers on the opposite side, the elimination of the impurities being effected by a blast of air passing through the perforated surface of the cylinder and carrying the dust and impurities with it.

In one form of condenser heretofore used the ends of the cylinder are connected with a flue or trunk, through which the air is continually exhausted by an independent fan for extracting the dust and impurities. In another form of condenser the blast from the gin-brush has been used for this purpose.

My invention, which preferably utilizes the blast from the gin-brush, consists in a perforated or meshed cylinder having tight or closed heads with a door therein, in combination with a pair of condensing-rollers and a case having side and bottom openings arranged to tightly inclose the periphery of the cylinder without closing the heads of the cylinder, by which construction the air-blast from the gin-brush is made to pass not only into the interior of the cylinder in a transverse direction through its perforated surface, but is also discharged transversely and the cylinder automatically cleaned by the reverse passage of air through the perforations in leaving the interior of the cylinder, and by which construction also access is had to the interior of the cylinder through the door in its head without opening any portion of the case, forming at the same time a cheaper and more compact construction.

In the drawings, A is the perforated or meshed cylinder, which is journaled in bearings in the frame-work B. E C is the case, which is made just long enough to inclose the cylinder, and of which the lower portion, E, is made stationary, and the upper portion, C, is hinged so as to be thrown back to give access to the periphery of the cylinder. This case is arranged to entirely and tightly close in the periphery of the cylinder, but does not close in the heads of the cylinder, but leaves them exposed, as shown at *h* in Fig. 2. This cylinder, instead of having open ends, is made with tightly-closed ends, in which is formed a door, *f*, through which access is had to the interior. This door *f* in the solid head *h*, in connection with an open-ended case, it will be seen, permits access to be had to the interior of the cylinder to remove the accumulated impurities without opening or removing any portion of the case, and still allows the blast of air from the gin-brush to circulate transversely through the cylinder in eliminating the impurities.

The case E is formed with an inlet, *x*, Fig. 3, which registers with the outlet from the gin. When the condenser is attached, and when the cylinder revolves in the direction of the arrow, the fleece passes over the same and between the two rollers D D, which are journaled in the frame-work upon the opposite side of the cylinder from the gin. As the fleece passes over the perforated cylinder the air-blast from the gin-brush passes transversely through said fleece and the perforations in the cylinder, carrying all dust, dirt, and impurities to the interior of said cylinder. This air-blast is prevented from descending upon the outside surface of the cylinder next the gin by the flexible apron or flap at the opening *x*, and is therefore made to pass through the fleece with its full effective power. As fast as the air finds its way to the interior of the cylinder at the top it finds its way through the bottom of the cylinder transversely, and is discharged through an opening, *g*, in the bottom of the case. It will thus be seen that as the air-blast escapes transversely from the interior of the cylinder, instead of through its open ends, as heretofore, the passage of the air through the holes or meshes in reverse direction in leaving the cylinder cleans the holes of filaments of lint, which would otherwise accumulate on the surface of the cylinder and obstruct its cleaning action.

For driving the several parts of my device motion is imparted to a pulley, *a*, on one of the rollers D, which at its opposite end bears a pulley, *b*. Around this pulley *b* there passes a belt, *d'*, which encompasses the larger pulley *d*, fixed on the axis of the perforated cylinder. This belt *d'* also bears in its passage against the lower side of a pulley, *c*, fixed on the upper roller, D, and causes this to revolve in the proper direction to coact with the lower roller in drawing through and compacting the fleece into a bat.

In practice I propose to use the blast of air created by the gin-brush; but the dust may be drawn off by a suction-fan or otherwise, and thereby the cotton cleaned more effectively during its passage through the top chamber of the condenser.

Having thus described my invention, what I claim as new is—

A cotton cleaner and condenser consisting of a revolving cylinder having a perforated or meshed periphery and solid heads with doors therein, in combination with a pair of condensing-rolls and a case having side and bottom openings, and inclosing the periphery of the cylinder, and open at the ends or heads of the same for giving access to the interior of said cylinder without opening the case, as described.

The above specification of my invention signed by me this 30th day of December, 1879.

THOS. CAMP.

Witnesses:
EDWD. W. BYRN,
SOLON C. KEMON.